(12) United States Patent
Drew et al.

(10) Patent No.: US 7,437,441 B1
(45) Date of Patent: Oct. 14, 2008

(54) USING DELTAS FOR EFFICIENT POLICY DISTRIBUTION

(75) Inventors: Daniel N. J. Drew, Bothell, WA (US);
David C. James, Bothell, WA (US);
Gopal Parupudi, Issaquah, WA (US);
Kenneth Mark Osborne, Sammamish, WA (US); Michael J. Healy, Redmond, WA (US); Deepak Kumar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1139 days.

(21) Appl. No.: 10/376,426

(22) Filed: Feb. 28, 2003

(51) Int. Cl.
*G06F 15/173* (2006.01)

(52) U.S. Cl. .................. 709/223; 709/203; 709/225; 709/229; 709/246; 709/248; 370/395.21

(58) Field of Classification Search ......... 709/223–226, 709/229, 201, 203, 246, 248; 370/395.21
See application file for complete search history.

(56) References Cited

U.S. PATENT DOCUMENTS

| | | | |
|---|---|---|---|
| 5,893,911 A | 4/1999 | Piskiel et al. | |
| 6,463,470 B1 | 10/2002 | Mohaban et al. | |
| 6,678,835 B1 * | 1/2004 | Shah et al. ........................ | 714/4 |
| 6,708,187 B1 * | 3/2004 | Shanumgam et al. ....... | 707/201 |
| 6,732,361 B1 | 5/2004 | Andreoli et al. | |
| 6,751,659 B1 * | 6/2004 | Fenger et al. ................ | 709/223 |
| 6,957,261 B2 | 10/2005 | Lortz | |
| 7,032,022 B1 * | 4/2006 | Shanumgam et al. ....... | 709/225 |
| 7,043,660 B1 * | 5/2006 | Bolar ............................. | 714/4 |
| 7,139,757 B1 | 11/2006 | Apollonsky et al. | |
| 7,233,948 B1 | 6/2007 | Shamoon et al. | |
| 2001/0007133 A1 * | 7/2001 | Moriconi et al. ............ | 713/201 |
| 2002/0026529 A1 * | 2/2002 | Sugahara .................... | 709/246 |
| 2002/0040396 A1 * | 4/2002 | Yoshihara et al. ........... | 709/225 |
| 2002/0099834 A1 | 7/2002 | Sielaff et al. | |
| 2002/0138631 A1 * | 9/2002 | Friedel et al. ............... | 709/229 |
| 2002/0138726 A1 * | 9/2002 | Sames et al. ................ | 713/166 |
| 2002/0184223 A1 | 12/2002 | Miura | |
| 2002/0186844 A1 | 12/2002 | Levy et al. | |
| 2002/0194317 A1 * | 12/2002 | Kanada et al. .............. | 709/223 |
| 2003/0018665 A1 * | 1/2003 | Dovin et al. ................ | 707/513 |
| 2003/0021283 A1 * | 1/2003 | See et al. .................... | 370/401 |
| 2003/0115246 A1 * | 6/2003 | Mahon et al. ............... | 709/200 |
| 2003/0115313 A1 * | 6/2003 | Kanada et al. .............. | 709/223 |
| 2003/0115484 A1 * | 6/2003 | Moriconi et al. ............ | 713/201 |
| 2003/0126236 A1 * | 7/2003 | Marl et al. .................. | 709/220 |

(Continued)

*Primary Examiner*—Oanh Duong
(74) *Attorney, Agent, or Firm*—Lee & Hayes, PLLC

(57) ABSTRACT

The present disclosure relates to mapping, tracking, and distributing policy to client devices. Policy, in particular lists of policy assignments are sent to client devices. A determination is made as to the changes or deltas between policy assignments that have been sent to client devices and policy assignments that must be sent to client devices. Identifying the delta policy assignments avoids the need be sent to client devices. Identifying the delta policy assignments avoids the need to send policy assignments that have not change and do not need to be sent to client devices. A server computer determines applicability of policy assignments to particular client devices, tracks if and when policy assignments have been deleted and allows the client to either receive a partial list of policy assignments that are required to update policy or a full list of policy assignments. Full, partial or not list policy assignment depends when a particular client device was last provided a policy assignment.

17 Claims, 11 Drawing Sheets

U.S. PATENT DOCUMENTS

| | | | |
|---|---|---|---|
| 2003/0131045 A1* | 7/2003 | McGee et al. | 709/201 |
| 2003/0182357 A1* | 9/2003 | Chess et al. | 709/203 |
| 2003/0229501 A1* | 12/2003 | Copeland et al. | 705/1 |
| 2004/0054791 A1* | 3/2004 | Chakraborty et al. | 709/229 |
| 2004/0083382 A1* | 4/2004 | Markham et al. | 713/200 |
| 2004/0083386 A1* | 4/2004 | Marquet et al. | 713/201 |
| 2006/0070129 A1* | 3/2006 | Sobel et al. | 726/23 |

* cited by examiner

| ASSIGNMENT | MachineID | PADBID | IsTombstoned | LastUpdateTime |
|---|---|---|---|---|
| Policy Assign. 1 | 1234 | 0091 | 0 | 05/16/02, 19:24 |
| Policy Assign. 2 | 1234 | 0121 | 1 | 11/25/02, 23:01 |
| Policy Assign. 3 | 1234 | 2341 | 1 | 02/18/03, 09:02 |
| Policy Assign. (N-1) | 1234 | 1232 | 0 | 04/15/02, 07:12 |
| Policy Assign. N | 1234 | 4532 | 0 | 07/03/02, 12:02 |

Resource Policy Map Table

Fig. 5A

| ASSIGNMENT | MachineID | PADBID | IsTombstoned | LastUpdateTime |
|---|---|---|---|---|
| Policy Assign. 3 | 1234 | 2341 | 1 | 02/18/03, 09:02 |
| Policy Assign. 2 | 1234 | 0121 | 1 | 11/25/02, 23:01 |
| Policy Assign. N | 1234 | 4532 | 0 | 07/03/02, 12:02 |
| Policy Assign. 1 | 1234 | 0091 | 0 | 05/16/02, 19:24 |
| Policy Assign. (N-1) | 1234 | 1232 | 0 | 04/15/02, 07:12 |

Resource Policy Map Table

Fig. 5B

| ASSIGNMENT | PolicyAssignmentID | Version | IsTombstoned | LastUpdateTime | Body |
|---|---|---|---|---|---|
| Policy Assign. 1 | 1234...3231 | 12...348 | 0 | 05/16/02, 19:24 | 42...248 |
| Policy Assign. 2 | 3241...1234 | 34...241 | 1 | 11/25/02, 23:01 | 33...234 |
| Policy Assign. 3 | 1245...2524 | 13...765 | 1 | 02/18/03, 09:02 | 34...876 |
| Policy Assign. (N-1) | 4334...3421 | 23...987 | 0 | 04/15/02, 07:12 | 34...213 |
| Policy Assign. N | 3443...2129 | 45...765 | 0 | 07/03/02, 12:02 | 13...118 |

Management Point Assignments Per Client Table

*Fig. 6*

| ASSIGNMENT | PolicyAssignmentID | Version | PADBID | Body | PolicyID | TombstoneTime |
|---|---|---|---|---|---|---|
| Policy Assign. 1 | 1234...3231 | 12...348 | 0091 | 42...248 | 33...143 | NULL |
| Policy Assign. 2 | 3241...1234 | 34...241 | 0121 | 33...234 | 35...120 | 1/23/03, 11:01 |
| Policy Assign. 3 | 1245...2524 | 13...775 | 2341 | 34...877 | 32...877 | 1/04/03, 07:15 |
| Policy Assign. (N-1) | 4334...3421 | 23...987 | 1232 | 34...213 | 77...294 | NULL |
| Policy Assign. N | 3443...2129 | 45...765 | 4532 | 13...118 | 11...233 | NULL |

Policy Assignment Table

Fig. 7

| ASSIGNMENT | MachineID | LastUpdateTime | LastSafeTime |
|---|---|---|---|
| Policy Assign. 1 | 1234 | 05/16/02, 19:24 | 05/16/02, 19:24 |
| Policy Assign. 2 | 1234 | 11/25/02, 23:01 | 9/25/02, 12:01 |
| Policy Assign. 3 | 1234 | 02/18/03, 09:02 | 01/18/03, 10:02 |
| Policy Assign. (N-1) | 1234 | 04/15/02, 07:12 | 05/15/02, 07:12 |
| Policy Assign. N | 1234 | 07/03/02, 12:02 | 07/03/02, 12:02 |

Resource Policy Change Table

Fig. 8

USING DELTAS FOR EFFICIENT POLICY DISTRIBUTION

TECHNICAL FIELD

The systems and methods described herein relate to providing policy to client devices. More specifically, the present invention relates to systems and methods that conditionally provide and control policy that is distributed to client devices.

BACKGROUND

Institutional information technology (IT) centers are responsible for keeping track of, assuring proper configuration of, and providing the latest software to client devices. Client devices include desktop personal computers (PC), mobile laptop PCs, personal digital assistants (PDA), and in certain cases, cellular telephones. IT centers typically manage and update hundreds, if not thousands, of client devices.

The management of client devices often involves the concept of "policy." Policy defines the operation of client devices as provided by an institutional IT center. A "policy object" is the actual executable code or instructions provided to a client device. Policy allows for uniformity of operation amongst client devices, including common background color, screen saver, graphical user interfaces, boot/reboot frequency, login/logoff procedure, operating system software, and application software.

Policy may include security software to detect for malevolent software such as viruses. IT centers are in the best position to determine existing software threats and provide appropriate policy to client devices to deal with such software threats. If updates are infrequent there is considerable chance that damage can result without the necessary up to date security software provided by policy.

Institutional asset management includes keeping track of assets such as client devices, and the software installed on client devices. Policy may include executable code on the client device that requires the client device to send information back to the IT center regarding the client device's serial or asset number. This executable code may be modified to change the update frequency back to the IT center. Part of this executable code or part of another piece of executable code, are instructions for the client device to query the IT center for new policy. The frequency of the query typically is included in the instructions for the client device.

Policy administration typically is based on a "pull" system, where client devices go to policy servers to request policy or policy information. In a pull system, it is desirable for client devices to frequently request for policy to assure that the client devices are in sync with the latest corporate policies (for example: have the latest virus signatures). The pull system is differentiated from a "push" system where a policy server or servers provide policy without request from client devices.

Policy information may include "policy assignments" that provide abbreviated information as well as links to policy objects. A policy assignment may include information as to applicability of a policy object to a client device (i.e., some policy objects apply or do not apply to certain client devices); and where a client device may access the policy object (e.g., a uniform resource locator (URL) directing the client device to a particular website). Policy or policy assignments are sent to the requesting client devices from a policy server or servers.

In a policy administration system a client device may access a policy server through a functional "management point." In certain applications a management point is part of a policy server. In other applications a management point is separate from a policy server. The management point may administer and track policy assignments sent to client devices. In order to simplify administration from the management point and to assure that client devices are current as to policy, a "full" list of policy assignments is sent whenever a policy object is added, modified, or deleted.

Client devices and policy servers are connected through various networks that include intranets and the Internet. Communication across the networks, in addition to client devices communicating with policy servers, includes client devices communicating with e-mail servers, client devices communicating with other client devices, client devices downloading data from software servers, and various other communications and downloads between computing devices connected across the networks.

The distribution of policy typically requires client devices throughout the enterprise to periodically verify that client device resistant software is correctly installed, is up to date, and working properly. This verification cycle can have negative effects in environments where network bandwidth and/or processing resources are limited. In certain situations, policy or software may be downloaded to a client device even though the client device may have the particular version of the policy or software.

Typically, the collection of client devices, computers, and networks of an institute is referred to as an "enterprise." "Bandwidth" is the capacity to communicate across the networks. "Enterprise bandwidth" is the capacity to communicate across the enterprise. The more frequent client devices pull and download policy, software, and lists of policy assignments, the more enterprise bandwidth is consumed and thus remaining bandwidth becomes constrained. The more constrained enterprise bandwidth becomes, the ability to check e-mail, visit the Internet, and perform other network (i.e., enterprise bandwidth) dependent tasks is negatively impacted. Enterprise bandwidth becomes particularly constrained when policy servers are downloading policy and lists of policy assignments to thousands of client devices throughout a limited bandwidth network.

Enterprise bandwidth may be conserved by a lower frequency of downloads to client devices; however, if policy is not frequently up to date at the client devices, problems can arise. Problems include client devices with different versions of software, operating systems, and interfaces. In addition, infrequent updates as to anti-virus software and other security software may lead to irreparable damage to client devices and the enterprise. In a pull system, frequent verification is necessary to assure that the proper security policy and software are made available to client devices. However, it is desirable to conserve enterprise bandwidth and avoid unnecessary download of policy and software. Instead of sending full lists of policy assignments, enterprise bandwidth can be conserved by sending only the policy assignments that have been changed since a list of policy assignments was last sent to a client device. The changed policy assignments are known as a "delta" or difference from the previous lists of policy assignments.

SUMMARY

The systems and methods described herein include a server computer that receives requests from client devices for lists of policy assignments. The server computer tracks what lists of policy assignments have been sent to the client devices as the lists are sent to the client devices.

In certain embodiments, a number of policy assignments are mapped to client devices describing which policy assignments are applicable to which client devices. The mapping can include if and when a particular policy assignment has been deleted.

Particular embodiments provide a client device and server computer to exchange "cookies" containing information as to which the particular client device was last updated with policy assignment. The cookie exchange may be based on the latest policy assignment that was sent to the client device.

Other embodiments provide for permanently deleting policy assignments from the mapping after a predetermined time period. Client devices that are updated outside of the predetermined time period are given a full list of policy assignments, while client devices within the predetermined time period are given either a limited list of policy assignments or no list.

BRIEF DESCRIPTION OF THE DRAWINGS

FIG. 5A is a block diagram illustrating a resource policy map table showing policy assignments for a particular client device.

FIG. 5B is a block diagram illustrating a resource policy map table showing policy assignments for a particular client device, where the policy entries are ordered by value as to when particular policy assignments were updated for the client device.

FIG. 6 is a block diagram illustrating a management point assignments per client table get table describing policy assignments for a particular client device.

FIG. 7 is a block diagram illustrating a policy assignment table describing information as to when a policy assignment has been deleted.

FIG. 8 is a block diagram illustrating a resource policy change table describing safe times for updates for a particular client device.

DETAILED DESCRIPTION

Exemplary System

Figure 1:
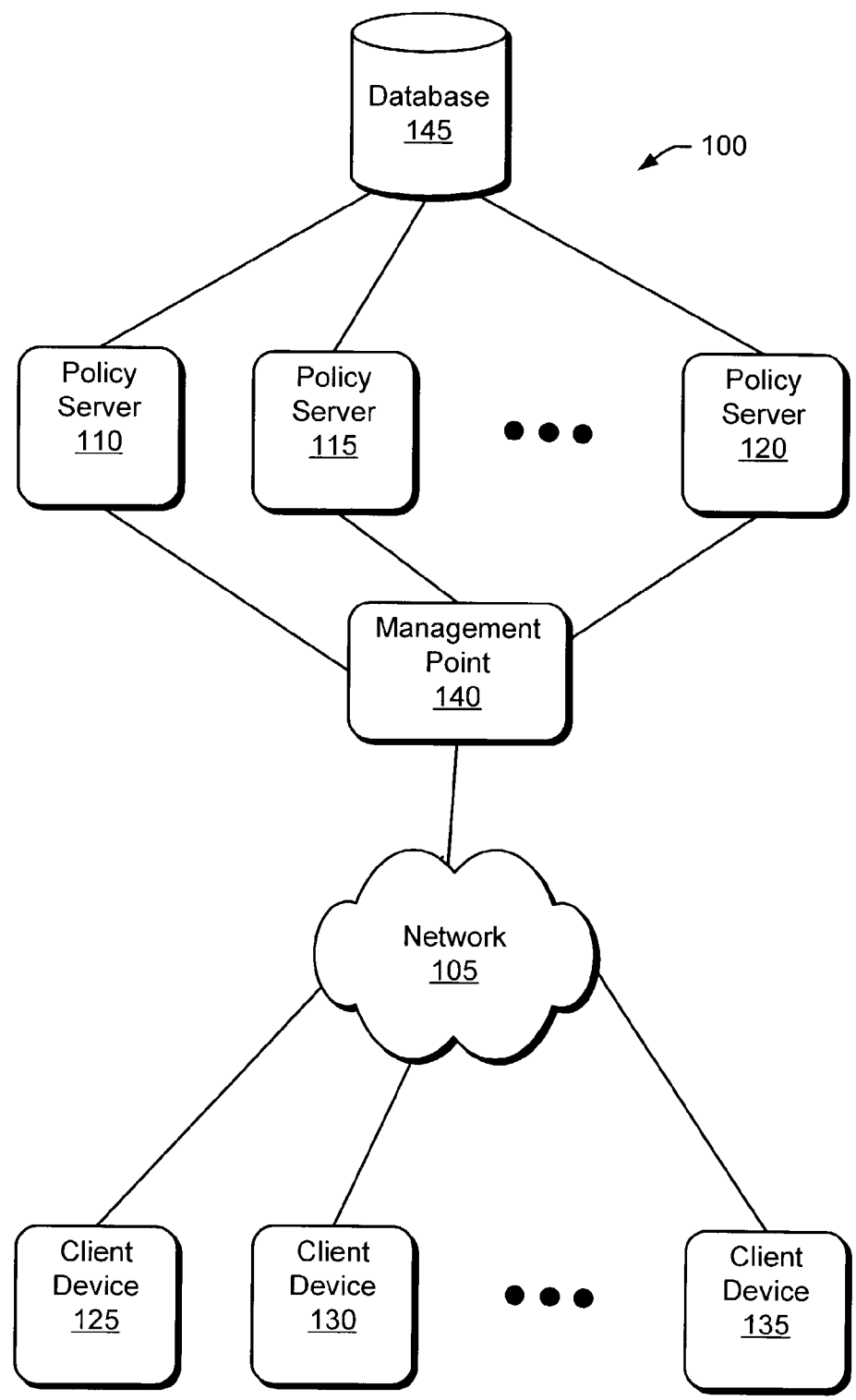
FIG. 1 is a block diagram illustrating an exemplary system to efficiently distribute through a network to client devices.

FIG. 1 shows an exemplary system 100 to efficiently distribute policy through a network (e.g., an organizational intranet and/or the Internet) to any number of client devices. Network 105 connects one or more policy servers 110, 115 and 120 to one or more client devices 125, 130, and 135. A common management point 140 tracks and distributes policy, including policy objects, policy assignments, and lists of policy assignments. Other embodiments make use of multiple management points. In certain embodiments, policy servers 110, 115, and 120 have dedicated management points.

In this particular example, policy servers 110, 115, and 120 receive policy objects (e.g., instructions relating to executable software and group of computer settings) from a common database 145. Client devices 125, 130, and 135 receive policy objects from database 145 through any of the policy servers 110, 115, and 120. Datebase 145 may further contain lists of policy assignments, mapping information, and policy related tables. Maintaining a separate data base allows servicing or replacing policy servers and management points.

Management point 140 tracks the policy objects that are sent to client devices 110, 115, and 120. Policy request may be made using one of several known languages such as server query language (SQL). SQL and similar languages may be used by and policy servers 110, 115, and 125, and database 140.

Policy servers 110, 115, and 120 may include logical management points from which policy assignments are administered and distributed. Management points may also be placed at secondary sites that are physically separate from policy servers 110, 115, and 120.

It is contemplated that system 100 incorporates a pull system where client devices 125, 130, and 135 request policy and software from policy servers 110, 115 and 120, in particular from management point 140. Policy servers 110, 115, and 120 through management point 140 distribute either a list of policy assignments and or policy objects stored in database 145 to client devices 125, 130, and 135. It is contemplated that policy objects distributed to client devices 125, 130, and 135 will identify from which policy servers 110, 115, and 120, or management point 140, policy assignments and or policy objects are pulled. Policy may include the frequency of "visits" of a particular client device to a particular policy server (or management point). Policy stored in a particular client device may also include primary, secondary, and tertiary policy servers from which policy is downloaded.

Exemplary Policy Server

Figure 2:
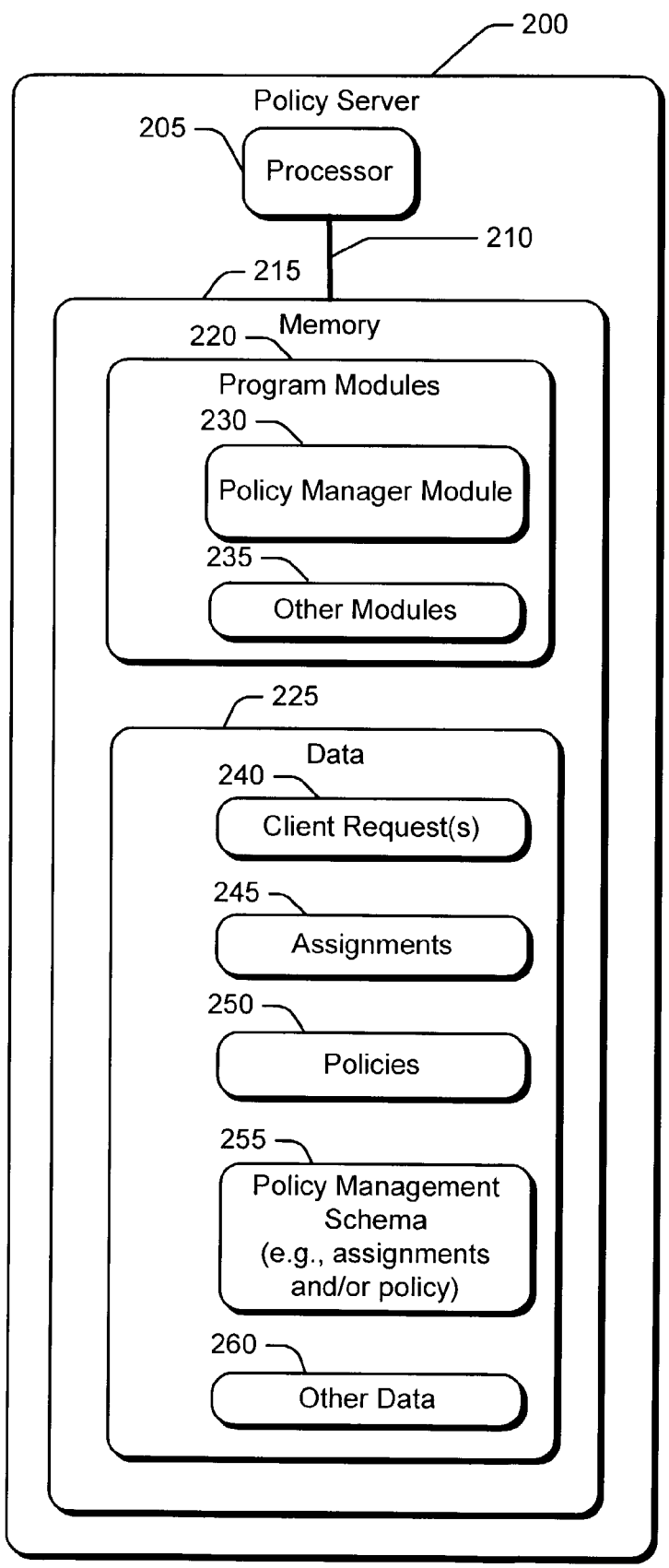
FIG. 2 is a block diagram illustrating an exemplary policy server.

FIG. 2 is a block diagram illustrating an exemplary policy server. Policy server computer 200 includes a processor 205 coupled across a bus 210 to a system memory 215. Bus 210 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

The system memory 215 includes a variety of computer-readable media. Such media may be any available media that is accessible by the processor 205, and includes both volatile and non-volatile media, removable and non-removable media. For example, the system memory 215 includes computer readable media in the form of volatile memory, such as random access memory (RAM), and/or non-volatile memory, such as read only memory (ROM). A basic input/output system (BIOS), containing the basic routines that help to transfer information between elements within computer 200, such as during start-up, is stored in ROM. RAM typically contains at least portions of program modules 220 and/or data 225 that are immediately accessible to and/or presently be operated on by the processor 205.

The processor 205 is configured to fetch and execute computer program instructions from applications or program modules 220 portion of memory 215. The processor 205 is also configured to fetch data from the data 225 portion of memory 215 while executing the program modules 220.

Program modules 220 may be described in the general context of computer-executable instructions being executed by a computer. Generally, program modules 220 include routines, programs, objects, components, data structures, etc., that perform particular tasks or implement particular abstract data types. Exemplary systems and procedures to efficiently distribute policy to any number of client devices in an enterprise network may be performed by program modules 220 that are executing on remote processing devices that are linked through a communications network. Accordingly, program modules 220 may be located in both local and remote computer storage media including memory storage devices.

The program modules 220 of the policy server computer 200 include, for example, a policy manager module 230, and other modules 235 such as an operating system. Data 225 includes client requests 240, policy assignment objects 245, policy objects 250, policy assignment schema 225, and other data 260 such as policy bundles.

The policy manager module 230, responsive to receiving a request 240 (i.e., a request for a policy assignment 245 or a particular policy object 250 from a client device, communicates one or more policy assignment objects 245 or policy objects 250 to the requesting client device. Policy assignment or policy assignment object ties a particular policy object to a particular scope of management and to a particular resource type (e.g., client device, application or user). A policy object includes the actual policy body information/data and may include a header. Policy assignment defines how the policy object is used or applied.

An Exemplary Client Device

Figure 3:
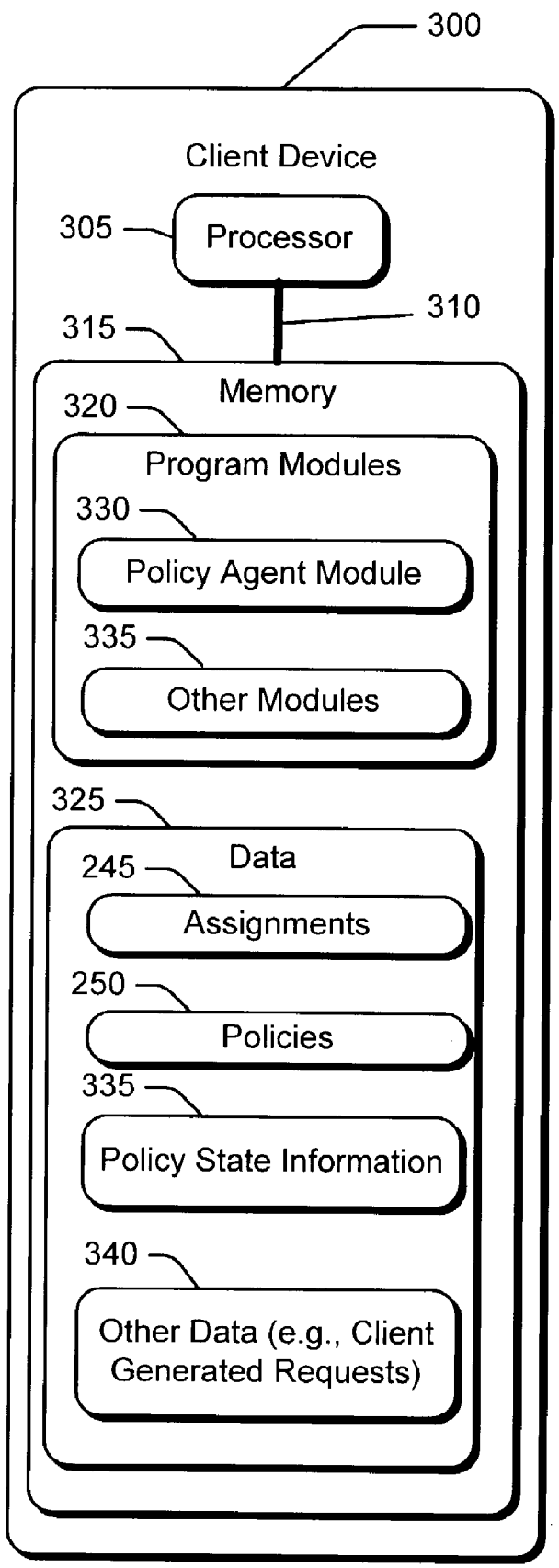
FIG. 3 is a block diagram illustrating an exemplary client device.

FIG. 3 is a block diagram illustrating an exemplary client device. Examples of client devices include desktop PCs, mobile laptop PCs, PDAs, and in certain cases, cellular telephones.

Client device 300 includes a processor 305 coupled across a bus 310 to a system memory 315. Bus 310 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

The system memory 315 includes a variety of computer-readable media. Such media may be any available media that is accessible by the processor 305, and includes both volatile and non-volatile media, removable and non-removable media. For example, the system memory 315 includes computer readable media in the form of volatile memory, such as random access memory (RAM), and/or non-volatile memory, such as read only memory (ROM). A basic input/output system (BIOS), containing the basic routines that help to transfer information between elements within client device 300, such as during start-up, is stored in ROM. RAM typically contains portions of program modules 320 and/or data 325 that are immediately accessible to and/or presently be operated on by the processor 305.

The processor 305 is configured to fetch and execute computer program instructions from applications or program modules 320 portion of memory 315. The processor 305 is also configured to fetch data from the data 325 portion of memory 315 while executing the program modules 320.

Program modules 320 may be described in the general context of computer-executable instructions being executed by a computer. Generally, program modules 320 include routines, programs, objects, components, data structures, etc., that perform particular tasks or implement particular abstract data types. Exemplary systems and procedures to download assignments 245 and policy 250 from a policy server may be performed by program modules 320 that are executing on remote processing devices that are linked through a communications network. Accordingly, program modules 320 may be located in both local and remote computer storage media including memory storage devices.

The program modules 320 of the client device 300 include, for example, the policy agent module 330, and other modules 335 such as an operating system. Data 325 includes one or more assignment objects 245, one or more policy objects 250, policy state information 335, and other data 340.

Exemplary Policy Object

Figure 4:
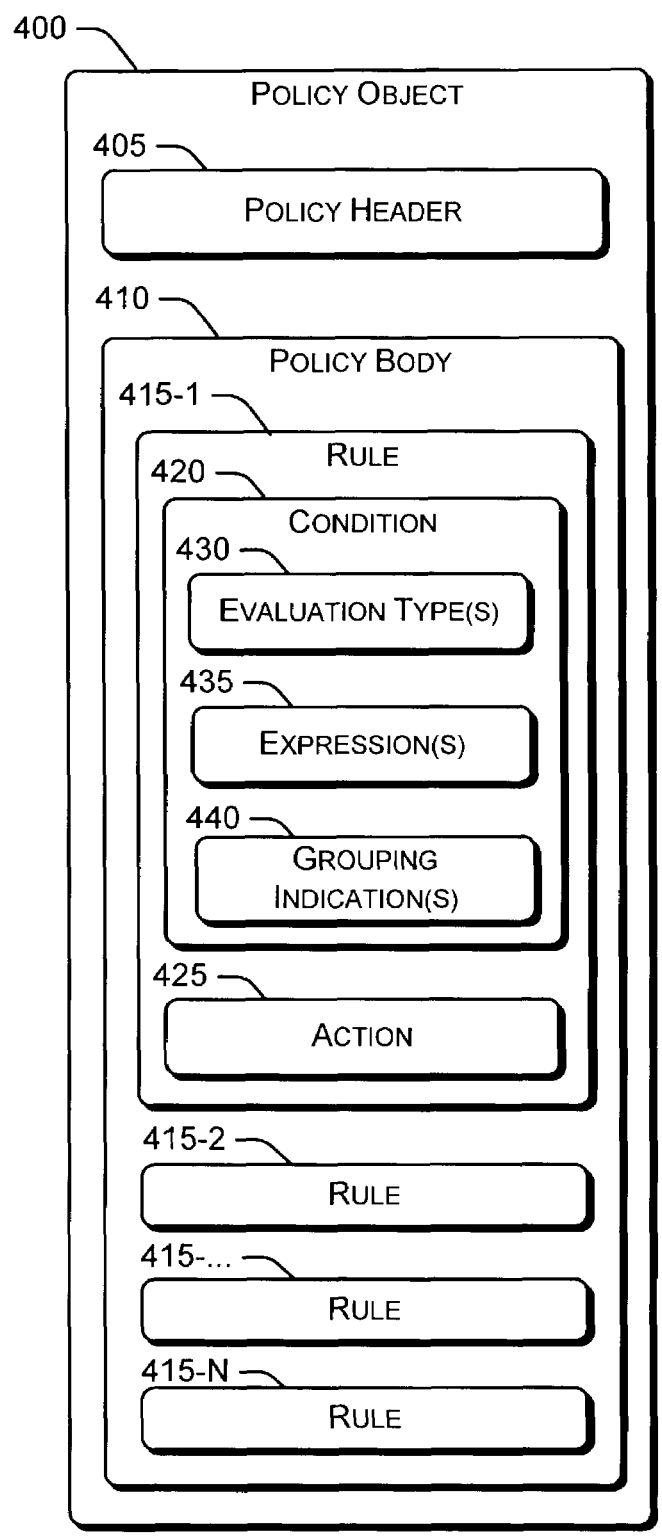
FIG. 4 is a block diagram illustrating an exemplary architecture for a policy object.

FIG. 4 shows an exemplary architecture for a policy object 400. It includes a policy header 405 and a policy body 410. The policy header 405 includes identification and context information for policy as contained in the policy body 410. Policy header 405 includes at least a subset of the following elements or data fields:

- "PolicyID" — a substantially unique ID that identifies this particular policy object.
- "PolicyVersion" — the particular version of the policy, or policy body 410 that is specific to the "PolicyID".
- "PolicySource" — the policy authority that generated the policy.
- "PolicyCategory" — The area of policy such as a software update, security, and so on, which may the identified as a hierarchical namespace.
- "Source" — this data field provides an indication of an entity (e.g. company, organization, and so on) that authored the policy body 410. A client device may use "Source" to download a policy object. "Source" may indicate a URL of a site from which to download the policy object or policy body 410.
- "Description" — this data field provides a brief summary of the intention and/or applicability of the policy provided by the policy body 410. A client device may use "Description" to determine if the particular policy applies to the client device.

Policy body 410 is a container for one or more policies and may contain sibling policies or a single policy. As discussed in describing "Source" above, a policy body 410 or a bundle of policies as defined by policy body 410 may be accessed via one or more in-line links such as a URL.

Policy body 410 includes one or more policy rules 415 (415-1 to 415-N). Each policy rule 415 may include a substantially unique identifier to distinguish it from other rules 415. Additionally, a policy rule 415 includes zero (0) or more policy conditions 420 and one or more policy actions 425. Each policy condition 420 includes one or more evaluation type indications 430, one or more expressions 435, and one or more grouping indications 440. A policy condition 420 can be presented in any of a number of different data formats such as the extensible markup language (XML) data format. An evaluation type indication 430 defines how the expression 435 in the condition 420 should be evaluated. An expression 435 may be expressed as XML.

Policy Assignment

A policy assignment ties a particular policy object to a particular scope of management and particular set of client devices. Policy objects may support multiple client devices. A policy assignment includes a number of properties or data fields that are used by a client device to identify the particular characteristics of a particular policy object.

Since policy objects can contain significant amounts of information, sending complete set of all policy objects to client devices can adversely impact enterprise bandwidth. As an alternative to sending complete policy objects, lists of policy assignments are sent to client device. A policy assignment may be a subset of a policy header of a policy object. In certain cases, a policy assignment is a policy header. The information or data fields as described as part of policy headers are part of a policy assignment. Such data fields allows client devices to identify applicable policy objects and if required download the applicable policy objects.

In particular, the data field "PolicyID" identifies the particular policy object to the client device. The data field "Description" informs the client device whether the policy object applies to the client device. The data field "Source" informs the client device where the policy object, policy body, or bundles of policy bodies may be downloaded.

A list of policy assignments may be sent to a particular client device. Lists of policy assignments may be managed from one or more policy servers or management points. In certain cases, policy list information may reside in a database or databases that are accessed by policy serves and/or management points.

Exemplary Tables

Policies, policy objects, and policy assignments are managed through maps and tables that are resident at management points, policy servers, and client devices. Data fields are defined that describe particular conditions and values of properties associated with each policy, policy object, and or policy assignments. The data fields are part of the maps and tables. The maps and tables exchange data field values and are updated as such values change.

The following are data fields that many be included in maps and tables, that are definable by particular properties including data type, field length, ability to provide register a null value, and a key or flag if applicable:
- "MachineID" is defined as an integer value (data type), has a length of 4 (field length), does not provide a null value (i.e., does not allow null), and is a primary key (i.e., may be used as identifier). "MachineID" is an integer identification value for a particular client device. "MachineID" value may be used with a group reference table to get a particular client device identifier and client device type.
- "PADBID" is defined as an integer value (data type), has a length of 4 (field length), does not provide a null value (i.e., does not allow null), and is a primary key (i.e., may be used as an identifier). "PADBID" is an integer identification value that may be used by a database to identify a particular policy assignment. PADBID stands for policy assignment database ID and is used instead of Policy Assignment ID (defined below) to optimize space in the database.
- "IsTombstoned" is defined as a bit value (data type), has a length of 1 (field length), allows a null value (i.e., allows null), and is not a primary key (i.e., is not used as an identifier). "IsTombstoned" value identifies if the policy assignment has been deleted from the client device. If the value is true the policy assignment is deleted for a particular client device. If the value is false the policy assignment is added for a particular client device. If the value is null no change is made as to the policy assignment for the particular client device. A null value may also indicate that a full policy list has been submitted to the resource.
- "PolicyAssignmentID" is defined as a variable character value (data type), has a length of 64 (field length), does not provide a null value (i.e., does not allow null), and is not a primary key (i.e., is not used as an identifier). "PolicyAssignmentID" is used to identify the policy assignment.
- "Version" is defined as a variable character value (data type), has a length of 50 (field length), does not provide a null value (i.e., does not allow null), and is not a primary key (i.e., is not used as an identifier). "Version" defines the policy assignment version.
- "Body" is defined as an image value (data type), has a length of 16 (field length), allows for a null value (i.e., allows null), and is not a primary key (i.e., is not used as an identifier). "Body" refers to the content of the policy assignment.
- "PolicyAssignmentID" is defined as a variable character value (data type), has a length of 64 (field length), does not provide a null value (i.e., does not allow null(, and is not a primary key (i.e., is not used as an identifier). "PolicyAssignmentID" is used to identify the policy assignment.
- "Version" is defined as a variable character value (data type), has a length of 50 (field length), does not provide a null value (i.e., does not allow null), and is not a primary key (i.e., is not used as a identifier). "Version" defines the policy assignment version.
- "PolicyID" is defined as a variable character value (data type), has a length of 64 (field length), does not provide a null value (i.e., does not allow null), and is not a primary key (i.e., is not used as an identifier). "PolicyID" is used to identify the policy, or policy object.
- "TombstoneTime" is defined as a date and time value (data type), has a length of 8, allows for null value (i.e., allows null), and is a primary key (i.e., may be used as an identifier). "TombstoneTime" indicates the date and time the assignment was tombstoned (i.e., deleted), and is set to null if the assignment is still active.
- "LastUpdateTime" is defined as a date and time value (data type), has a length of 8 (field length), does not provide a null value (i.e., does not allow null), and is not a primary key (i.e., is not used as an identifier). "LastUpdateTime" is the time that the policy assignment for the particular resource was last added, removed, or updated.
- "LastSafeTime" is defined as a date and time value (data type), has a length of 8, does not provide a null value (i.e., does not allow null), and is a not primary key (i.e., is not used as an identifier). "LastSafeTime" is the earliest time from which an assumption may be made that deltas (i.e., policy assignment changes) may be calculated. "LastSafeTime" is compared as to the "LastUpdateTime" as sent by a client device.

Cookie Exchange

"Cookies" are relatively small data units that are passed between client devices and policy servers or management points. In this particular example, "LastUpdateTime" values are treated as cookies and exchange between a client device and a management point (or policy server). When a policy server or a management point sends a particular policy assignment or a list of policy assignments is sent to a client device, a "LastUpdateTime" value is sent as a cookie. The next time the client device talks to the policy server or the MP, it passes back the same "LastUpdateTime" coolie back to the policy server or management point. The "LastUpdateTime" value (cookie) informs the policy server or management point as to when the client device last synchronized its list of policy assignments. This helps the Policy Server or MP to calculate any new changes since this "LastUpdateTime".

An empty cookie or a value of zero for "LastUpdatetime" indicates a client device has contacted the policy server or management point for the first time. Typically, a policy server or management point sends a full list of policy assignments when an empty cookie is received.

A null value "LastUpdateTime" cookie may be passed by a client device. If a null value "LastUpdateTime" cookie is received, an indication is made to the policy server or management point that the client device may not be fully up to date as to policy. A current and full list of policy assignments is sent to the client device if a null value "LastUpdateTime" cookie is received.

Resource Policy Map Table

For certain embodiments, one or more management points track the lists of policy assignments that have been sent to client devices. A comprehensive mapping is maintained at the management to link policy assignments to particular client devices. The mapping further identifies if the particular policy has been deleted and when the policy assignment was sent to particular client devices. Tables extracted from the mapping data describe specific relationships, in particular relationships as to particular client devices.

FIG. 5A illustrates an exemplary resource policy map table 500 showing policy assignments of a particular client device. Table 500 includes data fields that associate policy assignments with client devices and describes characteristics or conditions of policy assignments. Data field "ASSIGNMENT" 505 identifies a particular policy assignment. The description may be made by an alphanumeric reference. For example particular policy assignment, a data field "MachineID" 510 identifies a particular client device associated with the policy assignment. A policy assignment may be associated with more than one client device. A data field "PADBID" 515 identifies where in a database the particular assignment resides or may be retrieved from. A data field "IsTombstoned" 520 identifies the state of the policy assignment. The policy assignment may be deleted, added or active based on the "IsTombstoned" value. Data field 525 identifies the date and time that the particular client device was provided or updated with the particular policy assignment.

Table 500 illustrates extracted data from the available mapping data for a particular client device. In this example, all polices for the client device with "MachineID" 1234 have been extracted. Rows 530(1) to 530(N) describe the applicable policy assignments to client device identified by "MachineID" 1234.

Referring to FIG. 5B, illustrated is a resource policy map table 500 which orders entries based on "LastUpdateTime" values. Rows 530(1) to 530(N) are reordered such that for their respective policy assignments, the latest or most recent "LastUpdateTime" values are listed first. In this example, the policy assignment with the latest "LastUpdateTime" value is policy assignment 3 as described by row 530(3). The policy server or management point knowing the latest "LastUpdatetime" determines when client device with "MachineID" 1234 was last provided an update.

As discussed above, the concept of a cookie is used in the exchange of "LastUpdateTime" values between client device and policy servers or management points. If the "LastUpdateTime" that the client device passes to the policy server or management point is different than the "LastUpdateTime" that is in the resource policy map table, it is determined that the client device needs to be updated for that particular policy assignment. The value "IsTombstoned" for the particular policy assignment is looked as to determine the applicability of the particular policy assignment. In other words, the particular policy assignment may be deleted or added to the particular client device as identified by "IsTombstoned". If "IsTombstoned" field value is 1 (deleted), the policy assignment is deleted for the particular client device. If "IsTombstoned" field value is 0 (added), the policy assignment is added to the particular client device. If "IsTombstoned" field value is set to NULL, no change is made.

Management Point Assignments Per Client Table

At the policy server or management point, policy assignments are tracked per each client device. FIG. 6 shows an exemplary management point (MP) assignments per client 600 that describes the policy assignments for a particular client device. MP assignments per client table 600 is dynamically generated by a management point or a policy server per each client. Data fields in MP assignments per client table 600 describe particular characteristics of policy assignments to the policy server or management point as they relate to a particular client device. Data field "ASSIGNMENT" 605 describes the particular policy assignment. Associated with each policy assignment is an identifier value that is unique to the particular policy assignment and identified by data field "PolicyAssignmentID" 610. Different versions may exist for a particular policy assignment. To differentiate which particular version of the policy assignment applies to the client device, data field "Version" 615 is provided. Data field "IsTombstoned" 620 is provided in table 600 to indicate the state of the policy assignment as it applies to the client device. Data field "LastUpdateTime" 625 describes a date and time as to when the policy assignment was sent to the client device.

A data field "Body" 630 contains recognizable data to the client device identifying the particular policy assignment. When replying back to a client device, based on the MP assignments per client 600 that applies to the client device, when an "IsTombstoned" value as identified in data field 620 for a particular policy assignment is formed to be false, indicating that the policy assignment has been added, the policy server or management point sends the "Body" 630 entry for the particular policy assignment to the client device. If the "IsTombstoned" value is found to be 1, indicating that the policy assignment has been deleted, the policy server or management point may sent an XML tag which is defined in "Body" 630 to the client device indicating that the policy assignment has been deleted. An "IsTombstoned" value of 0 indicates an addition, and an "IsTombstoned" value of NULL indicates no change.

In this example, rows 635(1) to 635(N) define the policy assignments and their associated data field values as they relate to a particular client devices.

Policy Assignment Table

Deleted policy assignments may accumulate over time, and take up resources that support resource policy mapping. Deleted policy assignments are not actually deleted but are "tombstoned" or flagged as deleted. As discussed, deleted policy assignments are tombstoned to allow client devices to check and delete such policy assignments from their respective list of policy assignments. Since client devices visit and check policy assignments with different frequency and different times, deleted policy assignments must be kept around for a reasonable time to allow client devices to check and update policy assignments as necessary.

FIG. 7 shows an exemplary policy assignment table that describes when the particular policy has been deleted or tombstoned. Data field "ASSIGNMENT" 705 describes the particular policy assignment. Associated with each policy assignment is an identifier value that is unique to the particular policy assignment and identified by data field "PolicyAssignmentID" 710. Different versions may exist for a particular policy assignment. To differentiate which particular revision of the policy assignment applies to the client device, data field "Version" 715 is provided. A data field "PADBID" 720 identifies where in a database the particular assignment resides or may be retrieved from. A data field "Body" 725 contains recognizable data to the client device identifying the particular policy assignment. A data field "PolicyID" 730 identifies a policy or a policy body that is associated with the policy assignment.

The data field "TombstoneTime" 735 describes when the particular policy assignment was deleted or tombstoned. If the particular policy assignment is active, a "null" value appears for the "TombstoneTime" value. A condition may be set as to when deleted or tombstoned polices are permanently deleted. For example, deleted or tombstoned policy assignments may be deleted if they are more than a month old. The data field "TomestoneTime" provides the information as determining if a deleted or tombstone policy assignments meets or exceeds the condition.

In this example, rows 750(1) to 740(N) define the policy assignments and their associated data field values as they relate to a particular client devices.

Resource Policy Change Table

There are situations where certain client devices are updated over periods longer than when policy assignments are deleted or tombstoned. For example, a particular client device is updated every month and a half, however applicable policy assignments to the particular client device are deleted every month. Enterprise bandwidth is needlessly used if the particular client devices is sent a full list of policy assignments every month when deleted policy assignments are completely deleted, if the particular client device does not need a full list. It would be more efficient to only send delta or changed policy assignments.

A "LastSafeTime" value is tracked per client device. When a policy assignment is deleted from resource policy mapping, client devices are updated with a "LastSafeTime" value for the policy assignment that corresponds to the age out time (i.e., time that the policy assignment was removed per the maintenance schedule of permanently removing policy assignments). "LastSafeTime" for a particular policy assignment is set to the "ListUpdateTime" value when the client device first receives the particular policy assignment.

FIG. 8 shows an exemplary a resource policy change table 800 that describes safe times for a particular client device. Resource policy change table 800 is kept or accessed by a policy server and or management point. Data field "ASSIGNMENT" 805 describes a particular policy assignment. Data field "MachineID" 810 identifies a particular client device. In this example, the resource policy change table 800 is created based on a client device with the "MachineID" value of 1234. For each policy assignment data field "LastUpdateTime" 815 identifies when the particular policy assignment updated or was supplied to the client device. Data field "LastSafeTime" 820 identifies the earliest known change (e.g., deletion of the policy assignment) were made to the client device.

The cookie exchange between client device and policy server or management point compares the cookie having with the most recent "LastUpdate" value associated with the client device. If the cookie is older than the most recent "LastSafeTime" value, then a full list of policy assignments is sent to the client device.

Sending Full and Delta List of Policy Assignments

Figure 9:
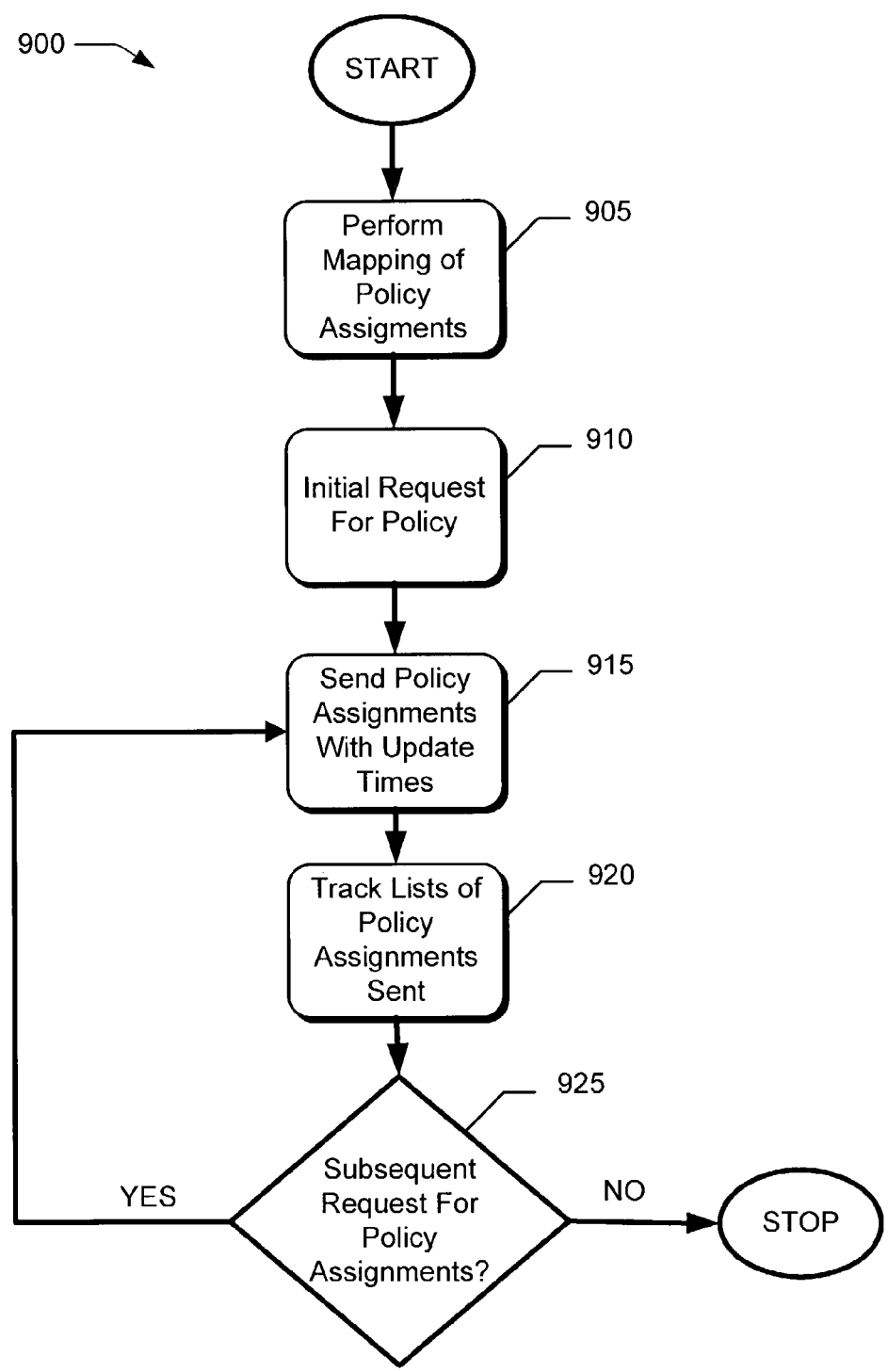
FIG. 9 is a flowchart illustrating the request of policy assignments from a client device, mapping of policy assignments to client devices, and the tracking of lists of policy assignments.

FIG. 9 shows a process 900 for managing and distributing policy assignments to one or more client devices. Blocks of process 900 represent computer executable instructions that may be performed on a computing device, such as a policy server. A policy server, a management point, or a database maintains a mapping of a number of policy assignments and their applicability to a number of client devices. At block 905, such a mapping is performed. The mapping may also include identifying the state of a particular policy assignment (i.e. if the policy assignment is deleted, added, or has not changed). Deleted or added assignments are treated as differences or deltas to lists of policy assignments that have been sent to client device.

The policy server or management point receives a request from a client device for a list of policy assignments on a periodic basis. In certain cases, the client device performs an initial request. At block 910, the policy server or management receives an initial request from a client device for a list of policy assignments. For an initial request the policy server or management points sends a full list of policy assignments that are applicable to the client device.

At block 915, the policy server or management point sends a list of policy assignments. Each policy assignment is identified with an update time value indicating when the policy assignment was sent to the client device. The most recent or latest update time associated with the policy assignment as the policy assignment applies to the client device is mapped either at a policy server, a management point, or a separate database.

At block 920, the policy server or management point tracks the list of policy assignments (including their update time) that was sent to the client device. The information from the tracking of lists of policy assignments is used to update mapping information.

At block 925, the policy server or management point may subsequent requests for a list of policy assignments (i.e., an update of policy assignments). The client device sends the request to the policy server or management point as a "cookie" with the most recent update time from the list of policy assignments resident at the client device. Therefore a subsequent request may be made (YES branch), or if not subsequent request is made the process ends (NO branch).

It is not necessary to send full lists of policy assignments to client devices when only certain policy assignments have changed state (i.e., deleted or added). In such situations deltas or changes to the list of policy assignments are sent to conserve enterprise bandwidth.

Figure 10:
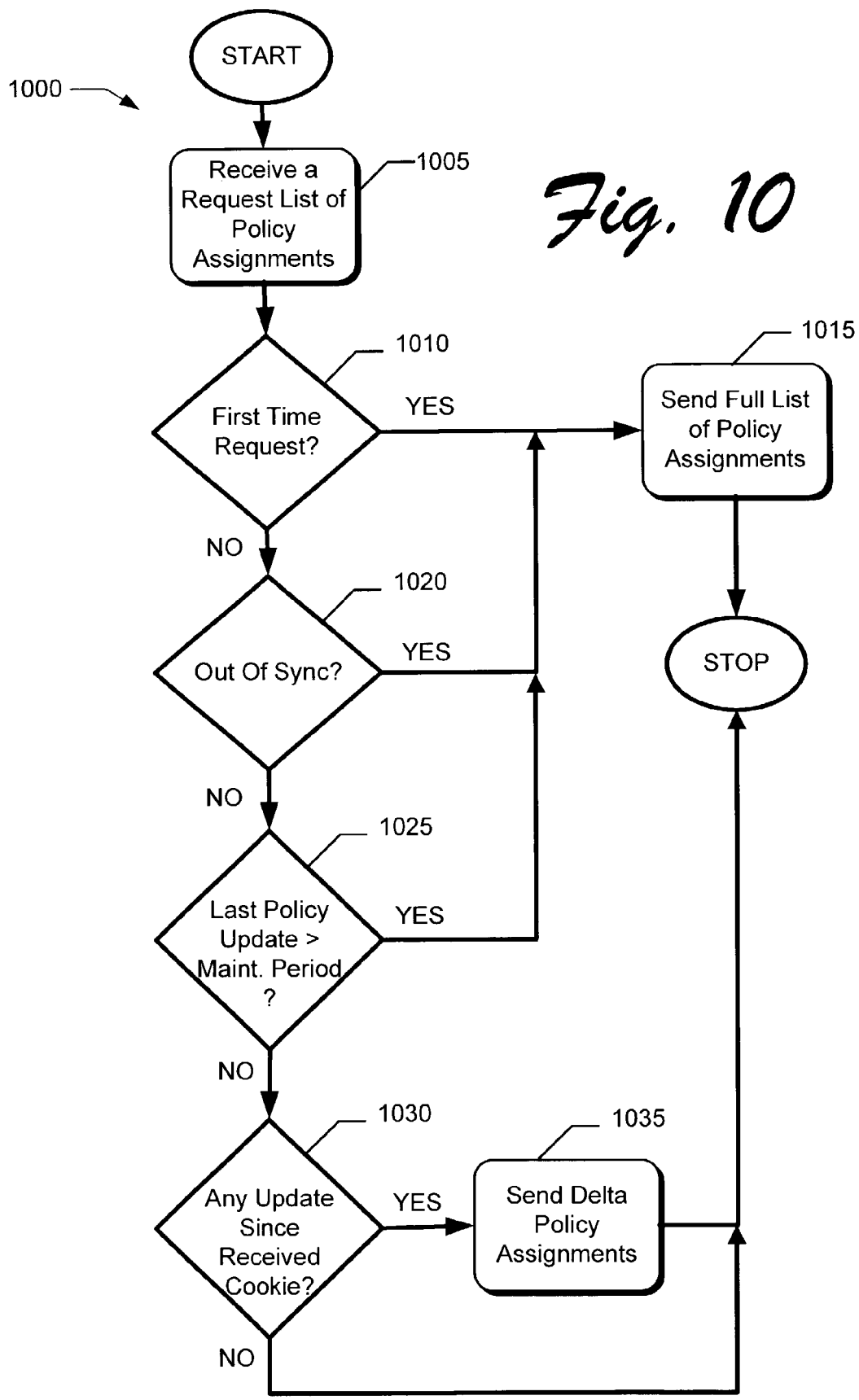
FIG. 10 is a flowchart illustrating when delta policy assignments are sent to a client device.

FIG. 10 shows a process 1000 when delta policy assignments are sent to a client device. Blocks of process 1000 represent computer executable instructions that may be performed on a computing device, such as a policy server. At block 1005, a policy server or management point receives a request for an applicable list of policy assignments from a client device.

At block 1010, the policy server or management point determines if the client device is requesting a list of policy assignments for the first time. Such a determination may be made if the client passes a cookie with a zero value (0) as discussed above. If the request is made for the first time (YES branch), the policy server or management point sends a full list of policy assignments as shown in block 1015.

In certain cases, the client device has received a list of policy assignments; however the client device may require a full list of policy assignments based on a number of conditions including out of synchronization with a policy server, a management point, or database (e.g., the database restored from backup), or if the most recent "LastUpdateTime" value in the policy assignments list is older than the most recent "LastSafeTime" value in the policy assignments list. For example the client device may be out of synchronization with information (e.g., policy assignment states) known by the policy server or management point. At block 1020, the policy server or management point determines whether the client device is out of synchronization. Such a determination may be made by receipt of a null cookie from the client device as discussed above. If the decision is made that the client device is out of sync (YES branch) a full list of policy assignments is sent to the client (Block 1015).

Other conditions that will send a full list to a client device include whether the last update has been greater than the time the maintenance or permanently deletion cycle was last run. At block 1025 a determination is made if the client device has been last updated before the time the maintenance cycle was last run. If so, tombstoned policy assignments may have been permanently removed and the client device has no way of knowing the condition of those permanently removed policy assignments. If such a condition exists (YES branch) block 1015 is followed and a full list of policy assignments is then sent.

If the conditions set forth in blocks 1010, 1020, and 1025 fail, a determination is made at block 1030 as to whether updates (i.e., deletions, subtractions, or modifications) to particular policy assignments have been since the time of the cookie sent by the client device. If no updates have been made there is no need to send policy assignments to the client and the "NO" branch is followed.

If any updates have been made as to the current mapping, the policy server or management point identifies the delta or changed policy assignments that apply to the client device. Delta policy assignments are identified by their "IsTombstoned" values, where only added or deleted policy assignments are sent to the client device. Policy assignments having an "IsTombstoned" value of 1, which indicate a deleted policy assignment, and value of 0, which indicate an added value, are sent to the client devices. Policy assignments having an "IsTombstoned" value of null are active and have been seen sent to the client device and need not be sent again. Only those delta policy assignments are sent to the client device as identified at block 1035.

Figure 11:
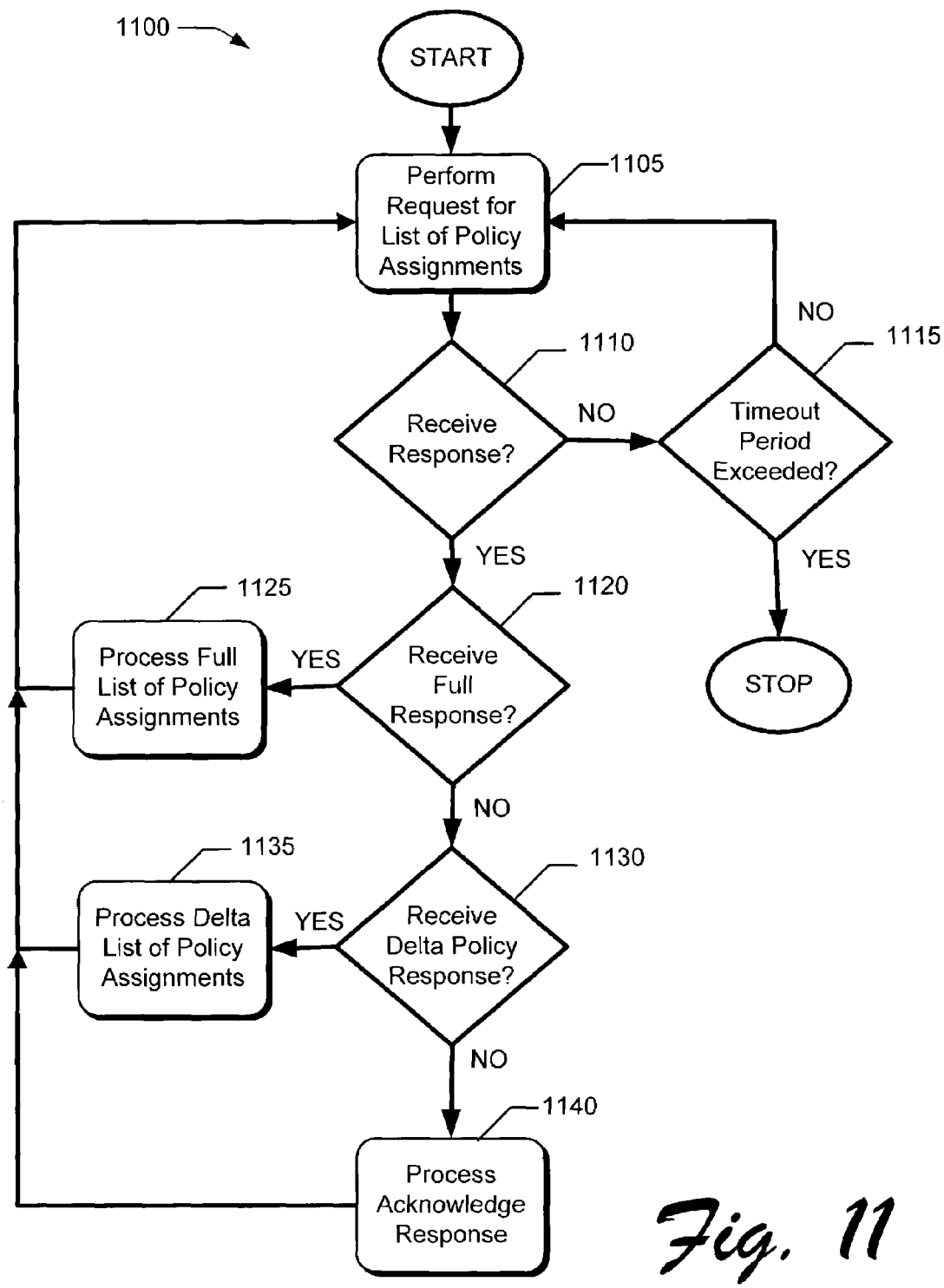
FIG. 11 is a flowchart illustrating a client device requesting and receiving delta policy assignments.

FIG. 11 shows a process 1100 of a client device to request policy assignments. Blocks of process 1100 represent computer executable instructions that may be performed on a client device.

At block 1105 a client device performs a request for a list of policy assignments to a management point or policy server. The client device continually performs requests for policy assignments. The request may be in the form of a cookie sent by the client device.

At block 1110, the client device determines if a response from the management point or policy server was received. If a response was not received, the "NO" branch is followed. At block 1115, a determination may be made if a timeout period to receive a response has expired. If the timeout period is not exceeded, the "NO" branch is followed and another request for list of policy assignments is performed. If the timeout period is exceeded, the "YES" branch is followed, and the process ends. If a response was received at block 1110, the "YES" branched is followed.

At block 1120, a determination is made if a "full" response of policy assignments is made. If a full response is received, the "YES" branch is followed and block 1125 is performed to process a full list of policy assignments. If a full response of policy assignments is not received, the "NO" branch is followed.

At block 1130, a determination is made if a response is made that only includes a "delta" list of policy assignments. If a delta list of policy assignments is received, then the "YES" branch is followed and block 1135 is performed to process a delta list of policy assignments. If a delta list of policy assignments is not received, the "NO" branch is followed.

If neither full not delta responses are received, the third response is an "acknowledgement" response that indicates to the client device that a management point or policy server is valid. At block, 1140 an acknowledgement response a processed.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method to distribute policy to a client device comprising:

receiving a request from a client device for a list of policy assignments;

determining if the client device is requesting the list of policy assignments for a first time, and if the request is made for the first time, then sending a full list of policy assignments;

determining if the client device is out of synchronization with a policy server or a management point, and if the client device is out of synchronization, then sending the full list of policy assignments;

determining if the client device has been updated before a last maintenance cycle was run, and if the client device was updated before the last maintenance cycle was run, then sending the full list of policy assignments;

determining whether an update to the list of policy assignments has been made since a time that a cookie was sent by the client device, and if updates have been made to the list of policy assignments, then sending only updated policy assignments; and tracking the full list of policy assignments and the updated policy assignments sent to the client device.

2. The method of claim 1 wherein the full list of policy assignments and the updated policy assignments include information as to where policy objects are retrieved by the client device.

3. The method of claim 2 wherein the information is a uniform resource locator.

4. The method of claim 1 wherein the request is in the form of a cookie.

5. The method of claim 4 wherein the cookie contains a value for the last update time for the client device.

6. The method of claim 4 wherein a null value for the cookie sends a full list of policy assignments to the client device.

7. The method of claim 4 wherein a zero value for the cookie sends a full list of policy assignments to the client device.

8. The method of claim 1 wherein the tracking comprises maintaining a mapping between a plurality of policy assignments and a plurality of client devices.

9. The method of claim 8 wherein the mapping comprises when client devices were updated with policy assignments.

10. The method of claim 8 wherein the mapping comprises a time when a policy assignment is deleted.

11. The method of claim 1 further comprising receiving the full list of policy assignments from a database.

12. A management point configured to perform a method comprising the steps of:
receiving a request from a client device for a list of policy assignments;
determining if the client device is requesting the list of policy assignments for a first time, and if the request is made for the first time, then sending a full list of policy assignments;
determining if the client device is out of synchronization with a policy server or a management point, and if the client device is out of synchronization, then sending the full list of policy assignments;
determining if the client device has been updated before a last maintenance cycle was run, and if the client device was updated before the last maintenance cycle was run, then sending the full list of policy assignments;
determining whether an update to the list of policy assignments has been made since a time that a cookie was sent by the client device, and if updates have been made to the list of policy assignments, then sending only updated policy assignments; and tracking the full list of policy assignments and the updated policy assignments sent to the client device.

13. A policy server configured to perform a method comprising the steps of:
receiving a request from a client device for a list of policy assignments;
determining if the client device is requesting the list of policy assignments for a first time, and if the request is made for the first time, then sending a full list of policy assignments;
determining if the client device is out of synchronization with a policy server or a management point, and if the client device is out of synchronization, then sending the full list of policy assignments;
determining if the client device has been updated before a last maintenance cycle was run, and if the client device was updated before the last maintenance cycle was run, then sending the full list of policy assignments;
determining whether an update to the list of policy assignments has been made since a time that a cookie was sent by the client device, and if updates have been made to the list of policy assignments, then sending only updated policy assignments; and tracking the full list of policy assignments and the updated policy assignments sent to the client device.

14. One or more computer-readable media containing computer program instructions for providing a list of policy assignments to a client device, the computer program instructions comprising instructions for:
mapping a list of policy assignments to a client device;
receiving a request from the client device for policy assignments;
determining if the client device is requesting the policy assignments for a first time, and if the request is made for the first time, then sending a full list of policy assignments;
determining if the client device is out of synchronization with a policy server or a management point, and if the client device is out of synchronization, then sending the full list of policy assignments;
determining if the client device has been updated before a last maintenance cycle was run, and if the client device was updated before the last maintenance cycle was run, then sending the full list of policy assignments;
determining whether an update to the list of policy assignments has been made since a time that a cookie was sent by the client device, and if updates have been made to the list of policy assignments, then sending only updated policy assignments; and
tracking the full list of policy assignments and the updated policy assignments sent to the client device.

15. A server comprising:
a memory;
a processor; and
a policy manager module stored in them memory and executable on the processor to receive a request from one or more client devices for one or more lists of policy assignments, wherein the policy manager:
determines if the one or more client devices is requesting the one or more lists of policy assignments for a first time, and if the request is made for the first time, then sending a full list of policy assignments,
determines if the one or more client devices is out of synchronization with a policy server or a management point, and if the one or more client devices is out of synchronization, then sending the full list of policy assignments,
determines if the one or more client devices have been updated before a last maintenance cycle was run, and if the one or more client devices were updated, then sending the full list of policy assignments,
determines if the list of policy assignments has been updated since a time that a cookie was sent by the client device, and if updates have been made to the list of policy assignments, then sending only updated policy assignments, and
tracks the full list of policy assignments and the updated policy assignments that are sent to the one or more client devices.

16. The server of claim 15 wherein the policy manager module further permanently deletes policy assignments have been identified s deleted after a predetermined time period.

17. The server of claim 16 wherein client devices that are updated outside of the predetermined time period are given a full list of policy assignments, and client devices within the predetermined time period are given either given a limited list of policy assignments or no list.

* * * * *